(12) United States Patent
Shin et al.

(10) Patent No.: US 10,260,760 B2
(45) Date of Patent: Apr. 16, 2019

(54) TWO-STAGE HEATING GEOTHERMAL SYSTEM USING GEOTHERMAL ENERGY

(71) Applicant: J&G, Jeonju-si Jeollabuk-do (KR)

(72) Inventors: Jeongsoo Shin, Suwon-si (KR); Jong-woo Park, Jeongeup-si (KR)

(73) Assignee: J&G, Jeonju-si, Jeollabuk-do (KR)

( * ) Notice: Subject to any disclaimer, the term of this patent is extended or adjusted under 35 U.S.C. 154(b) by 149 days.

(21) Appl. No.: 15/542,772

(22) PCT Filed: Oct. 31, 2016

(86) PCT No.: PCT/KR2016/012379
§ 371 (c)(1),
(2) Date: Jul. 11, 2017

(87) PCT Pub. No.: WO2017/078349
PCT Pub. Date: May 11, 2017

(65) Prior Publication Data
US 2017/0370622 A1    Dec. 28, 2017

(30) Foreign Application Priority Data
Nov. 5, 2015 (KR) .......................... 10-2015-0154842

(51) Int. Cl.
*F24D 3/08* (2006.01)
*F24D 3/18* (2006.01)
(Continued)

(52) U.S. Cl.
CPC ................ *F24D 3/18* (2013.01); *F24D 3/08* (2013.01); *F24D 17/00* (2013.01); *F24D 17/02* (2013.01);
(Continued)

(58) Field of Classification Search
CPC ...... F24D 2200/11; F24D 17/00; F24D 17/02; F24D 3/00; F24D 3/08; F24D 3/18;
(Continued)

(56) References Cited

U.S. PATENT DOCUMENTS

| 2014/0013786 A1* | 1/2014 | Kanamaru | ................ F22B 3/00 62/238.7 |
| 2018/0172287 A1* | 6/2018 | Goransson | ................ F24D 3/08 |

FOREIGN PATENT DOCUMENTS

| EP | 2202471 A1 * | 6/2010 | ............... F24D 3/18 |
| JP | 2001-343197 A | 12/2001 | |

(Continued)

OTHER PUBLICATIONS

International Search Report Corresponding to PCT/KR2016/012379 dated Feb. 10, 2017.
(Continued)

*Primary Examiner* — Mark A Laurenzi
*Assistant Examiner* — Xiaoting Hu
(74) *Attorney, Agent, or Firm* — Davis & Bujold PLLC; Michael J. Bujold

(57) ABSTRACT

Disclosed is a two-stage heating geothermal system using geothermal energy. The two-stage heating geothermal system includes a geothermal heat exchanger, a geothermal heat pump, a booster heat pump, a bypass line, and a bypass line opening and closing valve. The operating efficiency of the two-stage heating geothermal system using geothermal energy is significantly improved. Hot water supply, auxiliary heating, and the like are controlled to be completely independent of main heating.

5 Claims, 6 Drawing Sheets

(51) Int. Cl.
*F24D 17/00* (2006.01)
*F24D 17/02* (2006.01)
*F24T 10/10* (2018.01)
*F25B 13/00* (2006.01)
*F25B 27/00* (2006.01)
*F25B 30/00* (2006.01)
*F25B 30/02* (2006.01)
*F25B 30/06* (2006.01)
*F25B 41/00* (2006.01)
*F25B 41/04* (2006.01)

(52) U.S. Cl.
CPC .............. *F24T 10/10* (2018.05); *F25B 13/00* (2013.01); *F25B 27/00* (2013.01); *F25B 30/00* (2013.01); *F25B 30/02* (2013.01); *F25B 30/06* (2013.01); *F25B 41/00* (2013.01); *F25B 41/04* (2013.01); *F24D 2200/11* (2013.01); *F24D 2200/123* (2013.01); *F25B 2313/002* (2013.01); *F25B 2313/003* (2013.01); *F25B 2313/004* (2013.01); *F25B 2339/047* (2013.01); *F25B 2400/06* (2013.01); *Y02E 10/12* (2013.01)

(58) Field of Classification Search
CPC ........... F24D 2200/12; F24D 2200/123; Y02E 10/10; Y02E 10/12; F24T 10/10; F25B 2313/002; F25B 2313/003; F25B 2313/004; F25B 27/00; F25B 30/00; F25B 30/02; F25B 30/06; F25B 7/00; F25B 2400/06; F25B 13/00; F25B 29/003; F25B 41/00; F25B 41/04
See application file for complete search history.

(56) References Cited

FOREIGN PATENT DOCUMENTS

| | | | |
|---|---|---|---|
| JP | 2003-130490 A | 5/2003 | |
| KR | 100894297 B1 | 4/2009 | |
| KR | 10-0998483 B1 | 12/2010 | |
| KR | 10-1052465 B1 | 7/2011 | |
| KR | 10-1392714 B1 | 5/2014 | |
| KR | 10-1454282 B1 | 10/2014 | |
| WO | WO-2011008089 A1 * | 1/2011 | ............... F24D 3/18 |

OTHER PUBLICATIONS

Written Opinion Corresponding to PCT/KR2016/012379 dated Feb. 10, 2017.

* cited by examiner

FIG. 2

Borehole Design Project Report - 2015-10-08

Project Name: 000
Loads File: Jindo youth hostel_20151008   Project Start Date: 2015-10-08

Calculation Results

|  | COOLING | HEATING |
|---|---|---|
| Total Length (m) | 4132.6 | 1053.4 |
| Borehole Number | 22 | 22 |
| Borehole Length (m) | 187.8 | 47.9 |
| Ground Temperature Change (°C) | +1.0 | +3.8 |
| Unit Inlet (°C) | 30.0 | 5.0  EWT |
| Unit Outlet (°C) | 35.9 | 2.0 (Heatpump's Inlet Temp.) |
| Peak Load (kW) | 177.9 | 99.1 |
| Total Unit Capacity (kW) | 191.2 | 173.2 |
| Peak Demand (kW) | 62.8 | 38.2 |
| Heat Pump COP | 3.1 | 3.0  Heatpump's COP |
| System COP | 2.8 | 2.6 |
| System Flow Rate (L/min) | 576.6 | 321.2 |

Input Parameters

| Fluid | | Soil | |
|---|---|---|---|
| Flow Rate | 11.4 (L/min)/3.5kW | Ground Temperature: | 15.8 °C |
| Fluid: | 100% Water | Thermal Conductivity: | 3.46 W/(m*K) |
| Specific Heat (Cp): | 4.180 kJ/(K*kg) | Thermal Diffusivity: | 0.223 m^2/day |
| Density (rho): | 999.6 kg/m^3 | | |

| Piping | | | |
|---|---|---|---|
| Pipe Type | 1 1/4 in. (32 mm) | Radial Pipe Placement: | Average |
| Flow Type: | Turbulent - SDR11 | Borehole Diameter: | 150.1 mm |
| Pipe Resistance: | 0.041 m*K/W | Grout Thermal Conductivity: | 0.74 W/(m*K) |
| U-Tube Configuration: | Double | Borehole Thermal Resistance: | 0.177 m*K/W |

| Pattern | | Modeling Time Period | | Extra kW | |
|---|---|---|---|---|---|
| Vertical Grid Arrangement: | 2 x 11 | Prediction Time: | 20.0 years | Pump Power | 5.6 kW |
| Borehole Separation: | 5.0 m | Long Term Soil Temperatures: | | Cooling Tower Pump: | 0.0 kW |
| Boreholes per Parallel Circuit: | 1 | Cooling: | 16.8 °C | Cooling Tower Fan: | 0.0 kW |
| Fixed Length Mode | Off | Heating: | 19.6 °C | Additional Power | 0.0 kW |

| Heat Pumps | | Optional Boiler/Cooling Tower | | | |
|---|---|---|---|---|---|
| Manufacturer: | Addison | | | Tower | Boiler |
| Series: | Horizontal 1/2-10 Ton, HGY | Load Balance | | 0 % | 0 % |
| Design Heat Pump Inlet Load Temperatures: | | Capacity (kW) | | 0.0 | 0.0 |
| | Cooling (WB)   Heating (DB) | Cooling Tower Flow Rate (L/min): | | 0.0 | |
| Water to Air: | 19.4 °C   21.1 °C | Cooling Range (°C): | | 5.5 | |
| Water to Water: | 12.8 °C   37.8 °C | Annual Operating Hours (hr/yr): | | 0 | |

FIG. 3

Borehole Design Project Report - 2015-10-08

Project Name: 000
Loads File: Jindo youth hostel_20151008   Project Start Date: 2015-10-08

Calculation Results

|  | COOLING | HEATING |
|---|---|---|
| Total Length (m) | 4115.5 | 0.0 |
| Borehole Number | 22 | 22 |
| Borehole Length (m) | 187.1 | 0.0 |
| Ground Temperature Change (°C) | +0.9 | 0.0 |
| Unit Inlet (°C) | 30.0 | 20.0 (Heatpump's Inlet Temp.) |
| Unit Outlet (°C) | 35.9 | 16.7 |
| Peak Load (kW) | 177.9 | 99.1 |
| Total Unit Capacity (kW) | 191.2 | 235.3 |
| Peak Demand (kW) | 62.8 | 31.8 |
| Heat Pump COP | 3.1 | 3.8   Heatpump's COP |
| System COP | 2.8 | 3.1 |
| System Flow Rate (L/min) | 576.6 | 321.2 |

Input Parameters

| Fluid | | Soil | |
|---|---|---|---|
| Flow Rate | 11.4 (L/min)/3.5kW | Ground Temperature: | 15.8 °C |
| Fluid | 100% Water | Thermal Conductivity: | 3.46 W/(m*K) |
| Specific Heat (Cp): | 4.180 kJ/(K*kg) | Thermal Diffusivity: | 0.223 m^2/day |
| Density (rho): | 999.6 kg/m^3 | | |

| Piping | | | |
|---|---|---|---|
| Pipe Type: | 1 1/4 in. (32 mm) | Radial Pipe Placement: | Average |
| Flow Type: | Turbulent - SDR11 | Borehole Diameter: | 150.1 mm |
| Pipe Resistance: | 0.041 m*K/W | Grout Thermal Conductivity: | 0.74 W/(m*K) |
| U-Tube Configuration: | Double | Borehole Thermal Resistance: | 0.177 m*K/W |

| Pattern | | Modeling Time Period | | Extra kW | |
|---|---|---|---|---|---|
| Vertical Grid Arrangement: | 2 x 11 | Prediction Time: | 20.0 years | Pump Power | 5.6 kW |
| Borehole Separation: | 5.0 m | Long Term Soil Temperatures: | | Cooling Tower Pump: | 0.0 kW |
| Boreholes per Parallel Circuit: | 1 | Cooling: | 16.7 °C | Cooling Tower Fan: | 0.0 kW |
| Fixed Length Mode | Off | Heating: | 15.8 °C | Additional Power | 0.0 kW |

| Heat Pumps | | | Optional Boiler/Cooling Tower | | |
|---|---|---|---|---|---|
| Manufacturer: | Addison | | | Tower | Boiler |
| Series: | Horizontal 1/2-10 Ton, HGY | | Load Balance | 0 % | 0 % |
| Design Heat Pump Inlet Load Temperatures: | | | Capacity (kW) | 0.0 | 0.0 |
| | Cooling (WB) | Heating (DB) | Cooling Tower Flow Rate (L/min): | 0.0 | |
| Water to Air: | 19.4 °C | 21.1 °C | Cooling Range (°C): | 5.5 | |
| Water to Water: | 12.8 °C | 37.8 °C | Annual Operating Hours (hr/yr): | 0 | |

FIG. 4

Borehole Design Project Report - 2015-10-08

Project Name: 000
Loads File: Jindo youth hostel_20151008   Project Start Date:   2015-10-08

Calculation Results

|  | COOLING | HEATING |
|---|---|---|
| Total Length (m): | 4107.3 | 0.0 |
| Borehole Number: | 22 | 22 |
| Borehole Length (m): | 186.7 | 0.0 |
| Ground Temperature Change (°C): | +0.9 | 0.0 |
| Unit Inlet (°C): | 30.0 | 30.0 (Heatpump's Inlet Temp.) |
| Unit Outlet (°C): | 35.9 | 26.6 |
| Peak Load (kW): | 177.9 | 99.1 |
| Total Unit Capacity (kW): | 191.2 | 285.5 |
| Peak Demand (kW): | 62.8 | 28.6 |
| Heat Pump COP: | 3.1 | 4.3   Heatpump's COP |
| System COP: | 2.8 | 3.5 |
| System Flow Rate (L/min): | 576.6 | 321.2 |

Input Parameters

| Fluid | | Soil | |
|---|---|---|---|
| Flow Rate | 11.4 (L/min)/3.5kW | Ground Temperature: | 15.8 °C |
| Fluid: | 100% Water | Thermal Conductivity: | 3.46 W/(m*K) |
| Specific Heat (Cp): | 4.180 kJ/(K*kg) | Thermal Diffusivity: | 0.223 m^2/day |
| Density (rho): | 999.6 kg/m^3 | | |

| Piping | | | |
|---|---|---|---|
| Pipe Type: | 1 1/4 in. ( 32 mm ) | Radial Pipe Placement: | Average |
| Flow Type: | Turbulent - SDR11 | Borehole Diameter: | 150.1 mm |
| Pipe Resistance: | 0.041 m*K/W | Grout Thermal Conductivity: | 0.74 W/(m*K) |
| U-Tube Configuration: | Double | Borehole Thermal Resistance: | 0.177 m*K/W |

| Pattern | | Modeling Time Period | | Extra kW | |
|---|---|---|---|---|---|
| Vertical Grid Arrangement: | 2 x 11 | Prediction Time: 20.0 years | | Pump Power | 5.6 kW |
| Borehole Separation: | 5.0 m | Long Term Soil Temperatures: | | Cooling Tower Pump: | 0.0 kW |
| Boreholes per Parallel Circuit: | 1 | Cooling: 16.7 °C | | Cooling Tower Fan: | 0.0 kW |
| Fixed Length Mode | Off | Heating: 15.8 °C | | Additional Power | 0.0 kW |

| Heat Pumps | | Optional Boiler/Cooling Tower | | |
|---|---|---|---|---|
| Manufacturer: | Addison | | Tower | Boiler |
| Series: | Horizontal 1/2-10 Ton, HGY | Load Balance | 0 % | 0 % |
| Design Heat Pump Inlet Load Temperatures: | | Capacity (kW) | 0.0 | 0.0 |
| | Cooling (WB)    Heating (DB) | Cooling Tower Flow Rate (L/min): | 0.0 | |
| Water to Air: | 19.4 °C          21.1 °C | Cooling Range (°C): | 5.5 | |
| Water to Water: | 12.8 °C          37.8 °C | Annual Operating Hours (hr/yr): | 0 | |

TWO-STAGE HEATING GEOTHERMAL SYSTEM USING GEOTHERMAL ENERGY

TECHNICAL FIELD

The present disclosure relates to a two-stage heating geothermal system using geothermal energy in which a hot water production method having ultrahigh efficiency is realized by recycling waste heat of a geothermal heat pump.

BACKGROUND ART

A two-stage heating geothermal energy system using geothermal energy refers to a system able to provide cooling and heating as well as hot water to users using heat obtained by heat exchange conducted underground. Disclosed as examples of the two-stage heating geothermal energy system are Korean Patent No. 10-0998483 (titled: "MULTI-MODULE COOLING AND HEATING SYSTEM USING GEOTHERMAL HEAT EXCHANGE PUMP"), Korean Patent No. 10-1052465 (titled: "DUAL-TYPE HEAT PUMP SYSTEM USING HEAT TRANSFER MEDIUM AND REFRIGERANT"), Korean Patent No. 10-0900441 (titled: "HEAT PUMP COOLING AND HEATING SYSTEM USING GEOTHERM"), and the like.

Condensation heat created while a geothermal heat pump is providing cooling to a user side has been directed to the underground to be discarded. In such conventional two-stage heating geothermal energy systems using geothermal energy, such condensation heat is used as a heat source of a hot water tank through a separate bypass pipe or is used for auxiliary heating through a floor heating coil. However, the use of condensation heat as above has the following problems.

First, the temperature of heat discarded from the geothermal heat pump to the underground is about 25° C. to about 30° C., which has a significant difference from the temperature of hot water necessary for hot water supply or auxiliary heating, which is about 40° C. to about 50° C. Since repetitive heating is necessary to raise the temperature to a desirable temperature, a large amount of energy is spent in heating.

Second, since the temperature of hot water necessary for hot water supply or auxiliary heating is about 40° C. to about 50° C., a condensation temperature necessary for the geothermal heat pump must be significantly raised to a level of about 35° C. to about 50° C., which is the temperature of a typical operation. This causes an increase in the condensation temperature of Freon, thereby leading to an insignificant increase in the compression ratio of a compressor and an insignificant decrease in the efficiency (COP) of the geothermal heat pump. Accordingly, the amount of power consumed for the cooling operation of the geothermal heat pump is significantly increased.

Furthermore, a separate heat pump for hot water supply is not provided. In a heating mode in the winter, hot water produced for heating by the geothermal heat pump must be divided for heating and hot water supply, thereby reducing the usability of a geothermal heat source. In addition, when the temperature of water for heating is different from the temperature of water for hot water supply, it may be difficult to perform independent temperature control.

DISCLOSURE

Technical Problem

Accordingly, the present disclosure has been made in consideration of the above-described problems occurring in the related art, and the present disclosure proposes a two-stage heating geothermal system using geothermal energy that can improve the efficiency of a cooling and heating system by recycling waste heat generated by the operation of a geothermal heat pump.

Technical Solution

According to an aspect of the present disclosure, a two-stage heating geothermal system using geothermal energy may include: a geothermal heat exchanger able to perform heat exchange with an underground heat source; a geothermal heat pump able to perform a cooling and heating operation for a first user side using heat transferred from the geothermal heat exchanger; a booster heat pump able to perform at least one of a cooling and heating operation and a hot water supply operation for a second user side using a heat source, separately from the geothermal heat pump, the heat source being waste heat that has been generated due to the cooling and heating operation of the geothermal heat pump and has been transferred toward the geothermal heat exchanger; a bypass line connecting a pipe, by which the booster heat pump is connected to the second user side, and a pipe, by which the geothermal heat pump is connected to the first user side, such that heat generated by the booster heat pump is transferred to the first user side by bypassing the geothermal heat pump; and a bypass line opening and closing valve including a three-way valve disposed on a branch point between a pipe, by which the booster heat pump is connected to the second user side, and the bypass line to control a flow rate of refrigerant through the bypass line.

Advantageous Effects

Since the two-stage heating geothermal system using geothermal energy according to an aspect of the present disclosure includes the geothermal heat exchanger, the geothermal heat pump, and the booster heat pump, two-stage heating can be performed by the booster heat pump by recycling waste heat from the condenser that would otherwise be discarded to the underground during the cooling operation of the geothermal heat pump. It is thereby possible to significantly improve the operating efficiency of the two-stage heating geothermal system using geothermal energy without an adverse effect on the operating efficiency of the booster heat pump. In addition, refrigerant flowing toward the geothermal heat exchanger can be precooled due to heat absorption by the booster heat pump, thereby further improving the operating efficiency of the geothermal heat pump. Since medium-temperature condensation heat that would otherwise be dissipated to the underground is heated to a higher temperature, a speedier response than heating low-temperature refrigerant can be achieved. In addition, during the heating operation of the geothermal heat pump, the geothermal heat pump and the booster heat pump can share the geothermal heat exchanger via a single line, such that geothermal heat can be efficiently absorbed and hot water supply, auxiliary heating, and the like can be controlled to be completely independent of main heating.

DESCRIPTION OF DRAWINGS

FIG. 2 illustrates a simulation result in the two-stage heating geothermal system using geothermal energy according to the first embodiment, in a case in which an inlet temperature to a booster heat pump is 5.0° C.;

FIG. 3 illustrates a simulation result in the two-stage heating geothermal system using geothermal energy according to the first embodiment, in a case in which an inlet temperature to a booster heat pump is 20.0° C.;

FIG. 4 illustrates a simulation result in the two-stage heating geothermal system using geothermal energy according to the first embodiment, in a case in which an inlet temperature to a booster heat pump is 30.0° C.;

BEST MODE

Hereinafter, a two-stage heating geothermal system using geothermal energy according to exemplary embodiments will be described with reference to the accompanying drawings.

Figure 1:
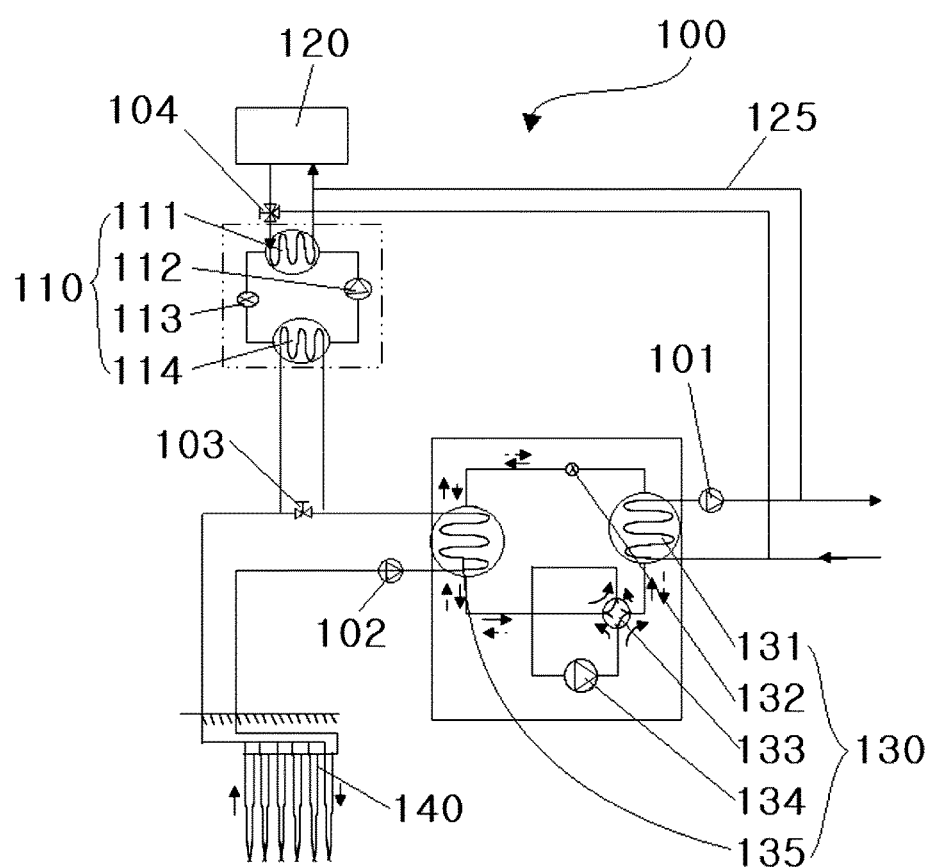
FIG. 1 is a schematic view illustrating a two-stage heating geothermal system using geothermal energy according to a first embodiment.

FIG. 1 is a schematic view illustrating a two-stage heating geothermal system using geothermal energy according to a first embodiment, FIG. 2 illustrates a simulation result in the two-stage heating geothermal system using geothermal energy according to the first embodiment, in a case in which an inlet temperature to a booster heat pump is 5.0° C., FIG. 3 illustrates a simulation result in the two-stage heating geothermal system using geothermal energy according to the first embodiment, in a case in which an inlet temperature to a booster heat pump is 20.0° C., and FIG. 4 illustrates a simulation result in the two-stage heating geothermal system using geothermal energy according to the first embodiment, in a case in which an inlet temperature to a booster heat pump is 30.0° C.

Referring to FIGS. 1 to 4, a two-stage heating geothermal system 100 using geothermal energy according to the present embodiment includes a geothermal heat exchanger 140, a geothermal heat pump 130, and a booster heat pump 110.

The geothermal heat exchanger 140 is buried underground to exchange heat with an underground heat source. The geothermal heat exchanger 140 may be implemented as an underground heat exchanger that is generally used.

The geothermal heat pump 130 can perform operations of providing cooling and heating to a first user side using heat transferred from the geothermal heat exchanger 140. The geothermal heat pump 130 includes a geothermal heat exchange-side geothermal heat exchanger 135, a user-side geothermal heat exchanger 131 exchanging heat with a user side that requires cooling, heating, and hot water supply, a geothermal heat expansion valve 132 expanding refrigerant that circulates through the inside of the geothermal heat pump 130, a geothermal heat compressor 134 compressing refrigerant that circulates through the inside of the geothermal heat pump 130, and a four-way valve 133 switching the flow direction of refrigerant that circulates through the inside of the geothermal heat pump 130 to switch between cooling and heating. The geothermal heat pump 130 has a cooling cycle produced by the geothermal heat exchange-side geothermal heat exchanger 135, the user-side geothermal heat exchanger 131, the geothermal heat expansion valve 132, the geothermal heat compressor 134, and the four-way valve 133. The geothermal heat pump 130 can perform a cooling and heating operation for the first user side.

The booster heat pump 110 can operate to perform at least one of a cooling and heating operation and a hot water supply operation for a second user side using a heat source, separately from the geothermal heat pump 130, the heat source being waste heat that has been generated due to the cooling and heating operation of the geothermal heat pump 130 and has been transferred toward the geothermal heat exchanger 140.

According to the present embodiment, the booster heat pump 110 is disposed in series on a pipeline, through which refrigerant flows from the geothermal heat pump 130 to the geothermal heat exchanger 140. Then, the waste-heat-containing refrigerant, produced by the cooling or heating operation, is directed toward the geothermal heat exchanger 140 after having passed through the booster heat pump 110.

The booster heat pump 110 includes: a heat source-side booster heat exchanger 114 allowing refrigerant that contains waste heat discarded from the geothermal heat pump 130 to circulate therethrough and exchange heat with refrigerant circulating through the inside of the booster heat pump 110; a user-side booster heat exchanger 111 exchanging heat directly with the second user side or with a hot water tank 120; a booster expansion valve 113 expanding the refrigerant circulating through the inside of the booster heat pump 110; and a booster compressor 112 compressing the refrigerant circulating through the inside of the booster heat pump 110. The booster heat pump 110 has a cooling cycle produced by the heat source-side booster heat exchanger 114, the user-side booster heat exchanger 111, the booster expansion valve 113, and the booster compressor 112 to perform a cooling and heating operation for the second user side while supplying hot water to the second user side.

Here, the first user side and the second user side may be the same space. For example, in the same space such as a house, when the first user side is a living room or the like in which floor heating is performed, the second user side may be a bathroom or the like to which hot water is supplied.

Reference numeral 103 indicates a refrigerant flow opening and closing valve controlling the flow of refrigerant to the booster heat pump 110. When the refrigerant flow opening and closing valve 103 is opened, refrigerant discharged by the geothermal heat pump 130 flows directly to the geothermal heat exchanger 140 by bypassing the booster heat pump 110. When the refrigerant flow opening and closing valve 103 is closed, refrigerant discharged by the geothermal heat pump 130 flows to the geothermal heat exchanger 140 after passing through the booster heat pump 110.

According to the present embodiment, the booster heat pump 110 is operated in an opposite manner to the geothermal heat pump 130. For example, the booster heat pump 110 is operated to provide heating while the geothermal heat pump 130 is being operated to provide cooling. On the other hand, the booster heat pump 110 is operated to provide cooling while the geothermal heat pump 130 is being operated to provide heating.

In response to the operation as described above, waste heat is discarded underground by the geothermal heat exchange-side geothermal heat exchanger 135 acting as a condenser during the cooling operation of the geothermal heat pump 130, and the booster heat pump 110 recovers the waste heat. The recovered waste heat can be used as a heating source of the heat source-side booster heat exchanger 114 acting as an evaporator of the booster heat pump 110. Thus, the booster heat pump 110 can use heat of the geothermal heat pump 130, i.e. a heat source having a relatively high temperature, as a heat source for heating the evaporator. This significantly reduces the compression ratio of the booster compressor 112, so that the two-stage heating geothermal system 100 using geothermal energy can have ultrahigh operating efficiency. It is possible to independently provide hot water supply, auxiliary heating, and the like with a high level of efficiency using the booster heat pump 110 while having substantially no effect on the operating efficiency of the geothermal heat pump 130. During the heating operation of the geothermal heat pump 130 in the winter, geothermal heat can be shared as the condenser heat source of the booster heat pump 110, thereby improving the efficiency of use.

The two-stage heating geothermal system 100 using geothermal energy may further include a bypass line (or a bypass pipeline) 125.

The bypass line 125 transfers heat generated in the booster heat pump 110 to the first user side by bypassing the geothermal heat pump 130.

Specifically, the bypass line 125 connects a pipe, by which the user-side booster heat exchanger 111 is connected to the hot water tank 120 (or directly to the second user side), and a pipe, by which the user-side geothermal heat exchanger 131 is connected to the first user side, such that at least a portion of refrigerant flowing from the booster heat pump 110 toward the hot water tank 120 can be directly delivered to the first user side by bypassing the geothermal heat pump 130.

Reference numeral 104 indicates a bypass line opening and closing valve that can open and close the bypass line 125. The bypass line opening and closing valve 104 is implemented as a three-way valve disposed on a branch point between a pipe, by which the booster heat pump 110 is connected to the second user side, and the bypass line 125. The bypass line opening and closing valve 104 can accurately control the flow rate of refrigerant through the bypass line 125.

Reference numeral 101 is a user-side refrigerant circulation pump allowing refrigerant to flow between the geothermal heat pump 130 and the first user side, while reference numeral 102 is a heat source-side refrigerant circulation pump allowing refrigerant to flow between the geothermal heat exchanger 140 and the geothermal heat pump 130.

Hereinafter, the operation of the two-stage heating geothermal system 100 using geothermal energy according to the present embodiment will be described with reference to the accompanying drawings.

First, the cooling operation of the two-stage heating geothermal system 100 using geothermal energy according to the present embodiment will be described.

When the geothermal heat pump 130 operates in a cooling mode, refrigerant of about 25° C. enters the geothermal heat exchange-side geothermal heat exchanger 135, acting as the condenser, from the geothermal heat exchanger 140. Afterwards, the temperature of the refrigerant is raised to about 35° C. by heat exchange in the geothermal heat exchange-side geothermal heat exchanger 135.

The refrigerant heated to 35° C. as described above is cooled down to about 30° C. by heat exchange during passage through the heat source-side booster heat exchanger 114, which is the evaporator of the booster heat pump 110. Afterwards, the refrigerant is directed to the geothermal heat exchanger 140 to be finally cooled down to about 25° C. by heat exchange with an underground heat source. Through this circulation process, the refrigerant is redirected toward the geothermal heat exchange-side geothermal heat exchanger 135.

When heat exchange as described above occurs in the heat source-side booster heat exchanger 114, refrigerant circulating through the inside of the booster heat pump 110 is heated to a temperature of about 28° C. Considering that the evaporation temperature of an evaporator of a typical heat pump is 5° C., the booster heat pump 110 is regarded as having obtained a heat source having a relatively high temperature.

The refrigerant circulating through the inside the booster heat pump 110 that has been heated as described above is condensed while passing through the user-side booster heat exchanger 111. Since the user-side booster heat exchanger 111 may have a condensation temperature of about 52° C. in order to produce hot water of about 50° C., the compression ratio of the booster compressor 112 can be significantly lowered compared to those of typical heat pumps, thereby significantly improving the coefficient of performance (COP) of the booster heat pump 110.

In addition, it is possible to improve the operating efficiency of the booster heat pump 110 while having no adverse effect on the booster heat pump 110. In addition, since refrigerant directed toward the geothermal heat exchanger 140 by the geothermal heat pump 130 can be preheated by heat exchange in the booster heat pump 110, the operating efficiency of the geothermal heat pump 130 can be improved.

FIGS. 2 to 4 illustrate simulation results in the two-stage heating geothermal system 100 using geothermal energy, in cases in which inlet temperatures to the booster heat pump 110 are 5.0° C., 20.0° C., and 30.0° C., respectively. Referring to FIGS. 2 to 4, it can be appreciated that the COP of the booster heat pump 110 gradually increases in the sequence of 3.0, 3.8, and 4.3 as the inlet temperature of the booster heat pump 110 increases.

Hereinafter, the heating operation of the two-stage heating geothermal system 100 using geothermal energy will be described.

When the geothermal heat pump 130 is operated in the heating mode, after refrigerant having a temperature of about 13° C. is introduced from the geothermal heat exchanger 140 to the geothermal heat exchange-side geothermal heat exchanger 135 acting as the evaporator, the refrigerant is cooled to a temperature of about 9° C. by heat exchange in the geothermal heat exchange-side geothermal heat exchanger 135.

The refrigerant cooled to temperature of about 9° C. as described above is cooled to a temperature of about 7° C. by heat exchange during passage through the heat source-side booster heat exchanger 114 acting as the evaporator of the booster heat pump 110. Afterwards, the refrigerant is heated to a temperature of about 13° C. by heat exchange during flowing toward the geothermal heat exchanger 140. Through this circulation process, the refrigerant is directed toward the geothermal heat exchange-side geothermal heat exchanger 135.

When the operation is performed as described above, the operating efficiency of the booster heat pump 110 can be improved without an adverse effect on the operating efficiency of the booster heat pump 110, and geothermal heat can be efficiently absorbed and used, since the geothermal heat pump 130 and the booster heat pump 110 share the geothermal heat exchanger 140 using a single line. In addition, the booster heat pump 110 can be operated completely independent of the geothermal heat pump 130, so that hot water supply, auxiliary heating, and the like can be performed independently. When the heating load of the first user side increases in freezing weather, the booster heat pump 110 can also be used to provide heating through the bypass line 125, together with the geothermal heat pump 130.

As described above, the two-stage heating geothermal system 100 using geothermal energy includes the geothermal heat exchanger 140, the geothermal heat pump 130, and the booster heat pump 110. This configuration allows two-stage heating to be performed by the booster heat pump 110 by recycling waste heat from the condenser that would otherwise be discarded to the underground during the cooling operation of the geothermal heat pump 130. It is thereby possible to significantly improve the operating efficiency of the two-stage heating geothermal system 100 using geothermal energy without an adverse effect on the operating efficiency of the booster heat pump 110. In addition, refrigerant flowing toward the geothermal heat exchanger 140 can be precooled due to heat absorption by the booster heat pump 110, thereby further improving the operating efficiency of the geothermal heat pump 130. Since medium-temperature condensation heat that would otherwise be discarded to the underground is heated to a higher temperature, a speedier response than heating low-temperature refrigerant can be achieved. In addition, during the heating operation of the geothermal heat pump 130, the geothermal heat pump 130 and the booster heat pump 110 can share the geothermal heat exchanger 140 via a single line, such that geothermal heat can be efficiently absorbed and hot water supply, auxiliary heating, and the like can be controlled to be completely independent of main heating.

Mode for Invention

Hereinafter, a two-stage heating geothermal system using geothermal energy according to another embodiment will be described with reference to the accompanying drawings. In the following, descriptions of some features will be omitted when they are identical to those of the above-described first embodiment of the present disclosure.

Figure 5:
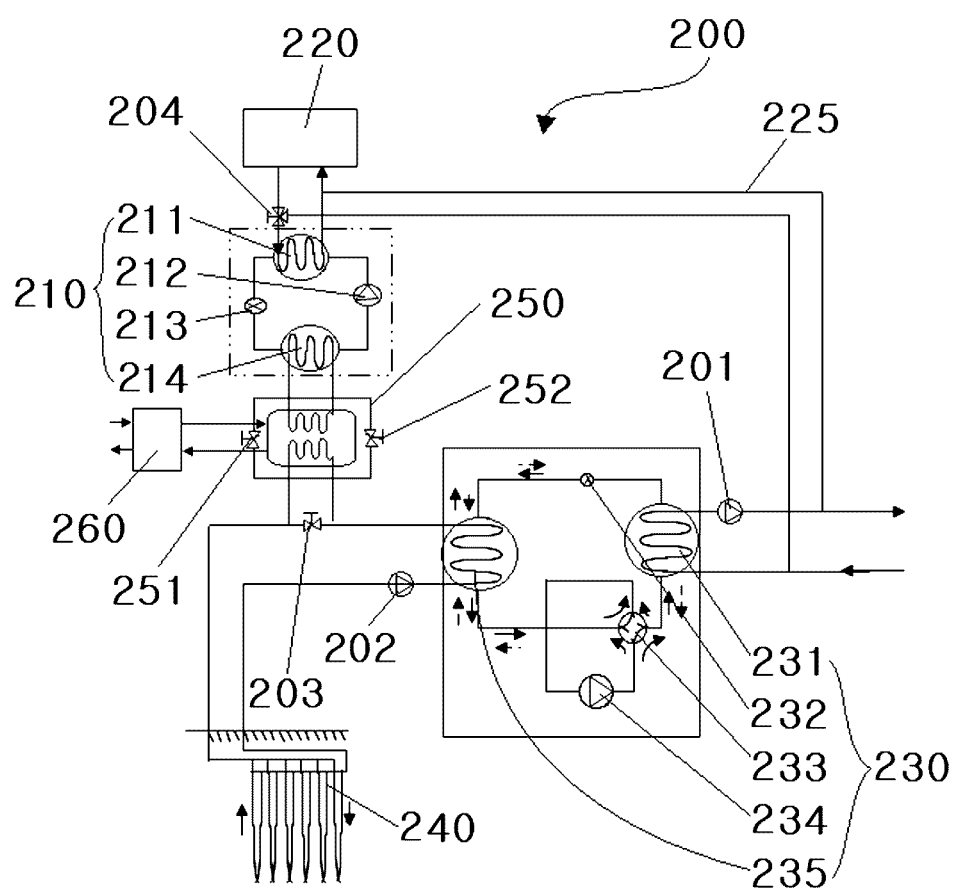
FIG. 5 is a schematic view illustrating a two-stage heating geothermal system using geothermal energy according to a second embodiment.

FIG. 5 is a schematic view illustrating a two-stage heating geothermal system using geothermal energy according to a second embodiment.

Referring to FIG. 5, the two-stage heating geothermal system using geothermal energy according to the present embodiment includes a triple heat exchanger 250 disposed on a pipe, by which a geothermal heat pump 230 and a booster heat pump 210 are connected.

The triple heat exchanger 250 is configured such that heat exchange occurs among three components, i.e. a pipe extending from a geothermal heat exchange-side geothermal heat exchanger 235 of the geothermal heat pump 230 to a geothermal heat exchanger 240, a heat source-side booster heat exchanger 214 of the booster heat pump 210, and a low-temperature hot water tank 260, such that waste heat generated by the geothermal heat exchanger 240 can be provided for hot water supply, auxiliary heating, and the like by the booster heat pump 210 while being used for low-temperature heating and the like in the low-temperature hot water tank 260.

Reference numerals 251 and 252 are triple heat exchange opening and closing valves disposed on pipes, by which the heat source-side booster heat exchanger 214 of the booster heat pump 210 is directly connected to a pipe extending from the geothermal heat exchange-side geothermal heat exchanger 235 of the geothermal heat pump 230 to the geothermal heat exchanger 240. When the triple heat exchange opening and closing valves 251 and 252 are closed, in the triple heat exchanger 250, heat exchange may occur among three components, i.e. a pipe extending from the geothermal heat exchange-side geothermal heat exchanger 235 of the geothermal heat pump 230 to the geothermal heat exchanger 240, the heat source-side booster heat exchanger 214 of the booster heat pump 210, and the low-temperature hot water tank 260. When the triple heat exchange opening and closing valves 251 and 252 are opened, in the triple heat exchanger 250, heat exchange from the triple heat exchanger 250 to the low-temperature hot water tank 260 does not occur but heat exchange occurs directly between the pipe extending from the geothermal heat exchange-side geothermal heat exchanger 235 of the geothermal heat pump 230 to the geothermal heat exchanger 240 and the heat source-side booster heat exchanger 214. Thus, selective operations can be performed.

Since heat exchange is performed in the triple heat exchanger 250 as described above, a portion of heat provided to the booster heat pump 210 by the geothermal heat pump 230 can be transferred to a third user side through the low-temperature hot water tank 260, the third user side requiring at least one of low-temperature cooling and heating and low-temperature hot water supply.

Hot water supply or auxiliary heating frequently requires a relatively low temperature during the cooling operation in the spring, winter, an in-between season, such as the beginning of the winter, or the summer. In such a case, it is possible to stop the operation of the booster heat pump 210 and use the low-temperature hot water tank 260. It is therefore possible to perform the operation purely using the waste heat of the condenser of the geothermal heat pump 230 without additional heating energy.

Figure 6:
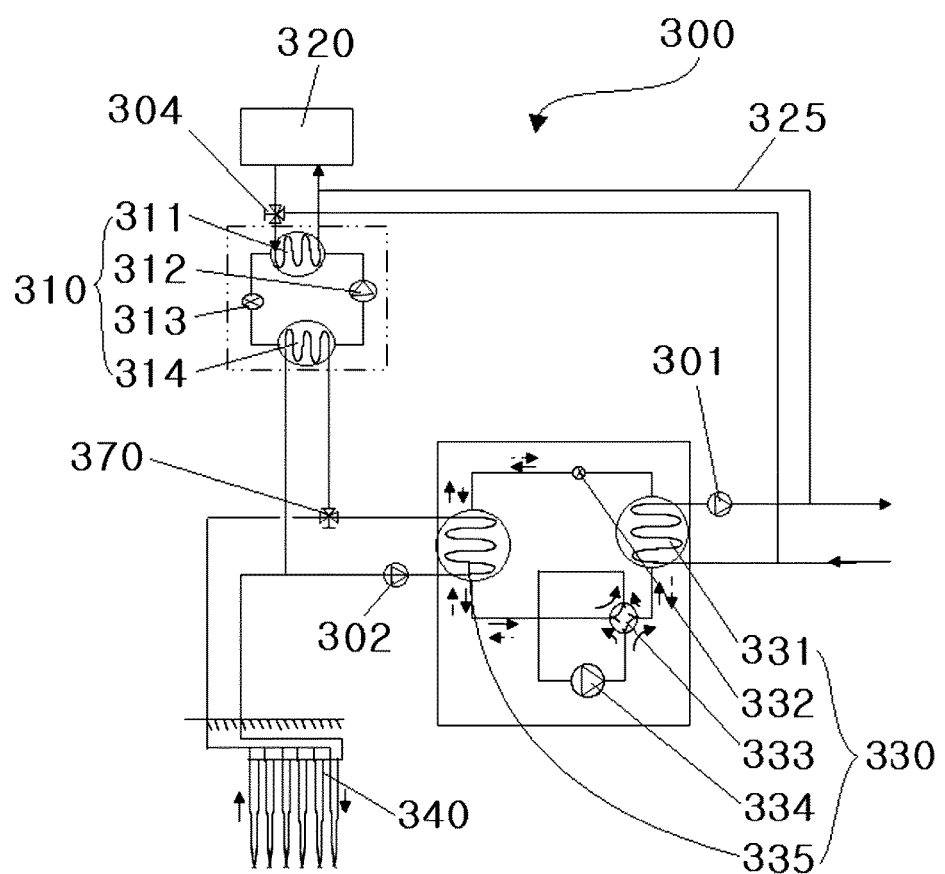
FIG. 6 is a schematic view illustrating a two-stage heating geothermal system using geothermal energy according to a third embodiment.

FIG. 6 is a schematic view illustrating a two-stage heating geothermal system using geothermal energy according to a third embodiment.

Referring to FIG. 6, according to the present embodiment, a booster heat pump 310 is connected in parallel to a pipe, by which a geothermal heat pump 330 and a geothermal heat exchanger 340 are connected.

Reference numeral 370 is an opening and closing valve able to control the flow of refrigerant from the geothermal heat pump 330 to the booster heat pump 310. The opening and closing valve 370 may be implemented as a three-way valve.

While the present disclosure has been illustrated and described with respect to the specific exemplary embodiments, it will be apparent to a person having ordinary skill in the art that many modifications and variations are possible without departing from spirits and scopes of the present disclosure defined by appended claims. It is definitely noted that such modifications and variations are included within the scope of the present disclosure.

INDUSTRIAL APPLICABILITY

The two-stage heating geothermal system using geothermal energy according to an aspect of the present disclosure can improve the operating efficiency of a cooling and heating system by recycling waste heat produced by the operation of a geothermal heat pump, and thus, can be regarded as having high industrial applicability.

The invention claimed is:
1. A two-stage heating geothermal system using geothermal energy, comprising:
a geothermal heat exchanger configured to perform heat exchange with an underground heat source;

a geothermal heat pump configured to perform a cooling and heating operation for a first user side using heat transferred from the geothermal heat exchanger;

a booster heat pump configured to perform at least one of a cooling and heating operation and a hot water supply operation for a second user side using a heat source, separately from the geothermal heat pump, the heat source being waste heat that has been generated due to the cooling and heating operation of the geothermal heat pump and which is transferred toward the geothermal heat exchanger;

a bypass line connecting a pipe by which the booster heat pump is connected to the second user side, and a pipe by which the geothermal heat pump is connected to the first user side, such that heat generated by the booster heat pump is transferred to the first user side by bypassing the geothermal heat pump; and a bypass line opening and closing valve comprising a three-way valve disposed on a branch point between the pipe by which the booster heat pump is connected to the second user side, and the bypass line to control a flow rate of refrigerant through the bypass line.

2. The two-stage heating geothermal system according to claim 1, further comprising a refrigerant flow opening and closing valve controlling a flow of refrigerant to the booster heat pump, wherein, when the refrigerant flow opening and closing valve is opened, refrigerant discharged by the geothermal heat pump flows directly to the geothermal heat exchanger by bypassing the booster heat pump, and when the refrigerant flow opening and closing valve is closed, refrigerant discharged by the geothermal heat pump flows to the geothermal heat exchanger after passing through the booster heat pump.

3. The two-stage heating geothermal system according to claim 1, wherein the booster heat pump is connected in parallel to a pipe by which the geothermal heat pump and the geothermal heat exchanger are connected.

4. The two-stage heating geothermal system according to claim 1, further comprising a triple heat exchanger disposed on a pipe by which the geothermal heat pump and the booster heat pump are connected, wherein heat exchange is performed by the triple heat exchanger, so that a portion of heat transferred to the booster heat pump by the geothermal heat pump is able to be transferred to a third user side that requires at least one of low-temperature cooling and heating and low-temperature hot water supply.

5. The two-stage heating geothermal system according to claim 4, further comprising a triple heat exchange opening and closing valve disposed on a pipe by which the booster heat pump is directly connected to a pipe extending from the geothermal heat pump to the geothermal heat exchanger, wherein, when the triple heat exchange opening and closing valve is closed, in the triple heat exchanger, heat exchange occurs among three components consisting of the pipe extending from the geothermal heat pump to the geothermal heat exchanger, the booster heat pump, and the third user side, and when the triple heat exchange opening and closing valve is opened, in the triple heat exchanger, heat exchange to the third user side does not occur but heat exchange occurs directly between the pipe extending from the geothermal heat pump to the geothermal heat exchanger and the booster heat pump.

\* \* \* \* \*